(12) United States Patent
Kern

(10) Patent No.: US 8,726,938 B2
(45) Date of Patent: May 20, 2014

(54) MEMBRANE VALVE

(75) Inventor: Joachim Kern, Elsenfeld (DE)

(73) Assignee: Unither Therapeutik GmbH, Elsenfeld (DE)

(*) Notice: Subject to any disclaimer, the term of this patent is extended or adjusted under 35 U.S.C. 154(b) by 0 days.

(21) Appl. No.: 13/380,578

(22) PCT Filed: Jun. 23, 2010

(86) PCT No.: PCT/DE2010/000716
§ 371 (c)(1),
(2), (4) Date: Mar. 12, 2012

(87) PCT Pub. No.: WO2010/149145
PCT Pub. Date: Dec. 29, 2010

(65) Prior Publication Data
US 2012/0172739 A1   Jul. 5, 2012

(30) Foreign Application Priority Data

Jun. 24, 2009 (DE) .................. 10 2009 030 186

(51) Int. Cl.
*F16K 15/14* (2006.01)
*F16K 15/16* (2006.01)

(52) U.S. Cl.
USPC .......................................... 137/854; 137/856

(58) Field of Classification Search
USPC ................... 137/843, 852, 854, 856; 251/331
See application file for complete search history.

(56) References Cited

U.S. PATENT DOCUMENTS

| | | | |
|---|---|---|---|
| 3,295,547 A | | 1/1967 | Scaramucci .................. 137/315 |
| 3,610,273 A | * | 10/1971 | Russell ....................... 137/513.3 |
| 3,626,978 A | * | 12/1971 | Hoekstra ....................... 137/854 |

(Continued)

FOREIGN PATENT DOCUMENTS

| | | |
|---|---|---|
| DE | 1 163 107 | 2/1964 |
| DE | 20 2004 021 350 U1 | 11/2007 |
| EP | 0 732 301 A1 | 9/1996 |
| JP | 5-177904 | 7/1993 |

OTHER PUBLICATIONS

English Language Translation of EP 0732301 A1; Espacenet website (Jan. 17, 2013).*

(Continued)

*Primary Examiner* — Craig Schneider
*Assistant Examiner* — Daphne M Barry
(74) *Attorney, Agent, or Firm* — Foley & Lardner LLP

(57) ABSTRACT

The invention relates to a membrane valve, in particular for inhalation devices, comprising a planar membrane made of permanently flexible material, a frame, which has an air opening that is somewhat smaller than the membrane, at least one web, which connects the frame to a retainer that is arranged approximately at the center of the air opening, and a pin, the shaft of which extends through a fastening opening approximately at the center of the membrane and is located in a retaining opening in the retainer, wherein the membrane lies on the frame in the rest state and wherein the pin is spread to form a head, the distance of which to the membrane is small in comparison to the thickness of the membrane or which head lies on the membrane, and the diameter of the shaft near the head is greater than the diameter of the fastening opening,; and the diameter of the shaft at the free end of the shaft is approximately equal to the diameter of the fastening opening.

10 Claims, 4 Drawing Sheets

(56) References Cited

U.S. PATENT DOCUMENTS

Figure 5:
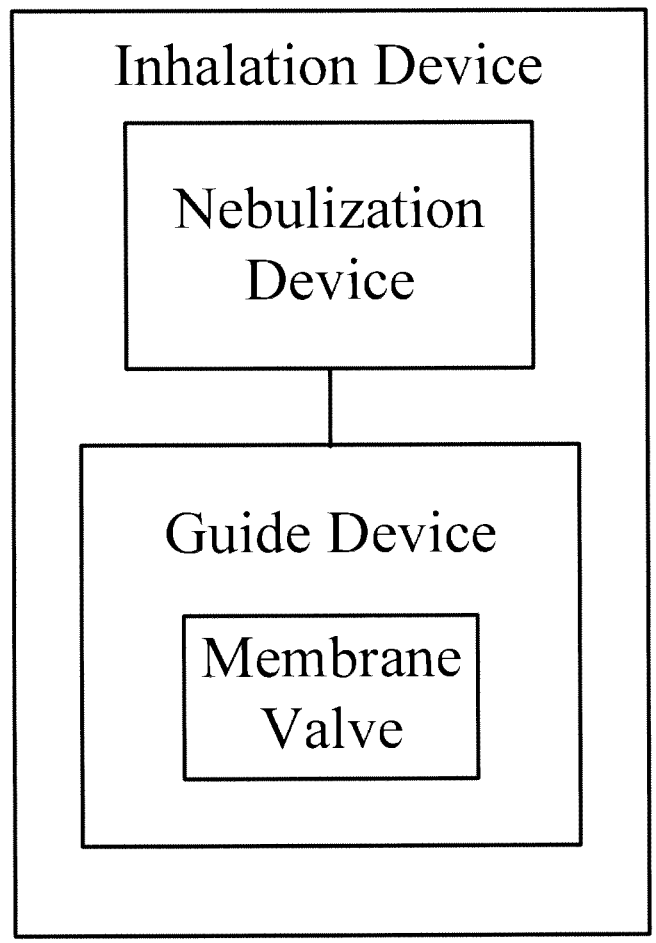
Figure 6:
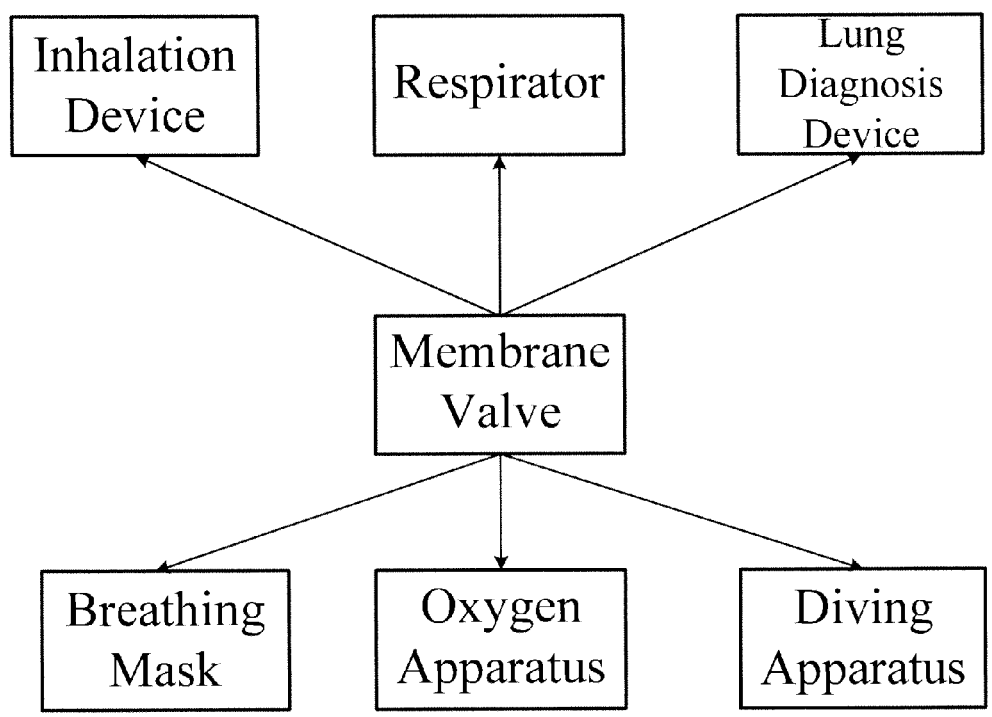

| | | | | |
|---|---|---|---|---|
| 4,838,262 A | * | 6/1989 | Katz | 128/205.24 |
| 5,601,112 A | * | 2/1997 | Sekiya et al. | 137/512.15 |
| 5,704,522 A | * | 1/1998 | Orgeolet et al. | 222/494 |
| 5,860,449 A | * | 1/1999 | Schulte | 137/550 |
| 6,062,248 A | | 5/2000 | Boelkins | 137/118.02 |
| 6,283,147 B1 | * | 9/2001 | Rosseel | 137/512.15 |
| 6,827,105 B1 | * | 12/2004 | Marble et al. | 137/854 |
| 7,100,637 B1 | | 9/2006 | Ball | 137/614.2 |
| 2007/0227536 A1 | * | 10/2007 | Rivera et al. | 128/200.21 |
| 2008/0078395 A1 | * | 4/2008 | Ho et al. | 128/205.24 |
| 2008/0185062 A1 | * | 8/2008 | Johannes Nijland | 137/854 |

OTHER PUBLICATIONS

International Preliminary Examination Report on Patentability from corresponding application Serial No. PCT/DE2010/000716, dated Jan. 17, 2012.

* cited by examiner

Figure 1
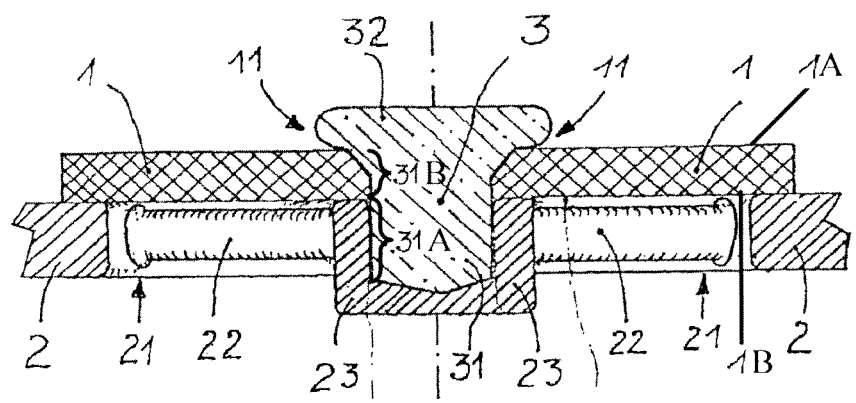
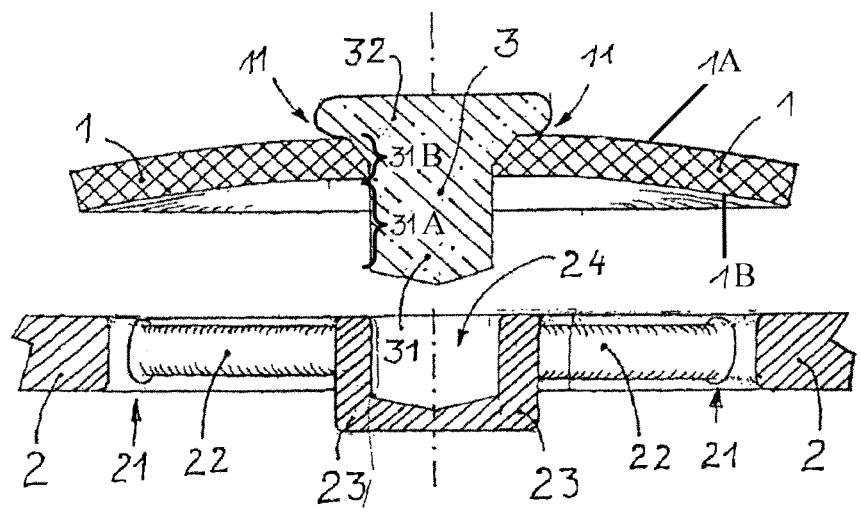
Figure 2

Figure 3
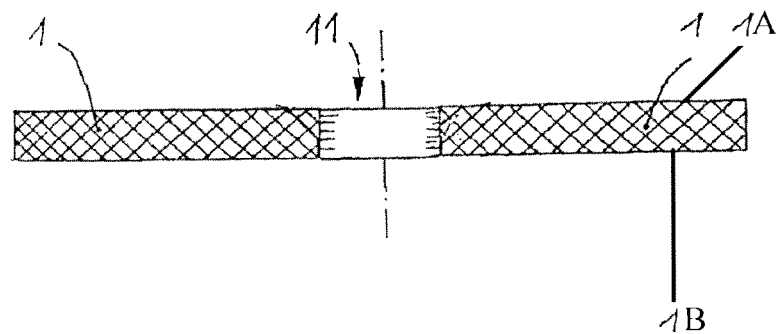
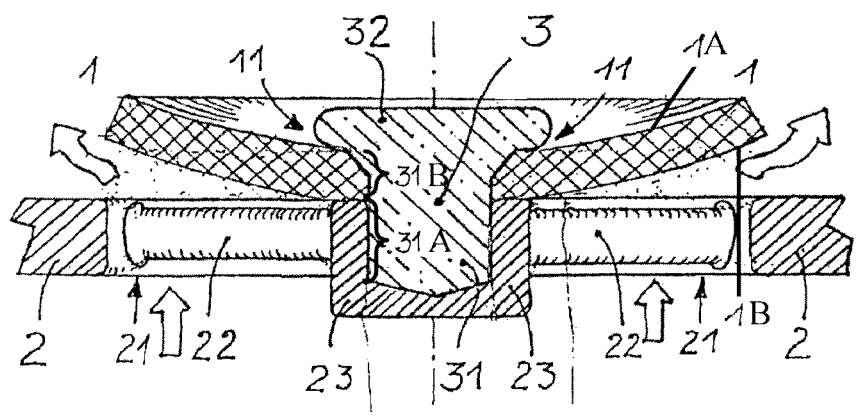
Figure 4

MEMBRANE VALVE

CROSS-REFERENCE TO RELATED APPLICATION

This Application is a Section 371 National Stage Application of International Application No. PCT/DE2010/000716, filed Jun. 23, 2010 and published as WO 2010/149145 on Dec. 29, 2010, in English, the contents of which are hereby incorporated by reference in their entirety.

The invention relates to a membrane valve, in particular for inhalation devices, comprising a planar membrane made of permanently flexible material, a frame, which has an air opening that is somewhat smaller than the membrane, at least one web, which connects the frame to a retainer that is arranged approximately at the centre of the air opening, and a pin, the shaft of which extends through a fastening opening approximately at the centre of the membrane and is located in a retaining opening in the retainer, the membrane lying on the frame in the rest state.

The extremely wide range of systems for guiding respiratory air of humans and other living organisms require the use of valves. A frequent task is to permit the organism unrestricted exhalation, for which purpose, by virtue of the breath of the organism, a membrane lifts from a frame, on which it lies in the rest state. Then the respiratory air can escape through an air opening in the frame. When the organism inhales again, the direction of the air stream reverses, so that the pressure on the membrane is eliminated and, by virtue of the elasticity of its material, it returns to the rest state in which it blocks the inflow of gases and liquids by lying on the frame. Instead, respiratory air is supplied from a different source, such as from a pressure tank or from the nebulization chamber of an inhalation device for introducing nebulized active substances into the respiratory air. Here, an essential function of the valve is that it not only blocks the inflow of gases but also prevents the ingress of liquids.

In the prior art, German utility model document DE 20 2004 021 350 discloses an outlet valve with which human respiratory air of a diver is expelled into the surrounding water. To this end, a membrane lies on the frame around an air opening, and is retained in the centre of the frame in a retainer, which is supported by webs. The membrane is fixed in this retainer by means of a pin.

On expulsion of the respiratory air, the elastic membrane is lifted from the frame so that air can escape. When the pressure of the respiratory air that is displaced outward is removed, the elasticity of the membrane moves the latter back onto the frame.

A considerable disadvantage of this arrangement is the limited sealing effect of the membrane against the penetration of water. To generate a higher contact pressure, the edge of the disk-shaped membrane is folded over somewhat around the edge, so that the membrane is no longer in area contact with the frame but only with the edge. By this means the contact surface is greatly reduced, so that the contact pressure of the membrane edge in the remaining annular region is relatively high. The essential disadvantage resulting therefrom, however, is that the respiratory air must apply an elevated pressure to move the membrane, since it has become relatively stiff by virtue of its profiling.

As another alternative, disk-shaped membranes are known which have the form of a ring, which is cut out from sheet-like elastic material. This ring poses a comparatively low resistance to the respiratory air.

Its considerable disadvantage, however, is that it only lies on its fixed counterpart—for example, a frame—as a result of which, capillary slits are formed. If liquids come into contact with these slits, they are propelled by the capillary effect, so that a small but constant liquid stream forms over a relatively long time.

Against this background, it is the function of the invention to develop a membrane valve the membrane of which is pressed with a relatively high force against the fixed frame, but which only opposes the passing air with a very small resistance.

As a solution, the invention proposes that the pin is spread to form a head, the distance of which to the membrane is small in comparison to the thickness of the membrane or which head lies on the membrane, and the diameter of the shaft near the head is greater than the diameter of the fastening opening, and the diameter of the shaft at the free end of the shaft is approximately equal to the diameter of the fastening opening.

The essential feature of the invention is the enlarged shaft of the pin in the vicinity of the head for fastening of the membrane valve. The advantageous effect achieved thereby can be best explained in the cross section of the membranes. In the outer layer of the membrane, which is more distant from the frame, the membrane is pressed apart by the increased diameter of the shaft. By this means, radially acting forces emanating from the centre of the outer surface of the membrane occur, which press the permanently flexible material of the membrane outward. The inner portion of the membrane, which faces the frame, is not loaded, since the diameter of the shaft in this area is only as large as the fastening opening in the membrane. By this means, the membrane is bulged, that is to say it is given a dome shape (with a relatively large diameter). As a consequence, the membrane only lies at its outer edge on the frame, but with a contact pressure that is increased thereby, and thus achieves a seal towards liquid that penetrates from outside.

So that the shaft enlargement becomes effective in a manner according to the invention, it must be located within the fastening opening of the membrane—for example in the case of a cylindrical fastening opening in the region of that side that faces away from the frame. To this end, the shaft of the pin must be brought to the suitable insertion depth.

As an embodiment for this, a stop is provided, which ensures the correct insertion depth. It is disposed within the retaining opening for the shaft and allows the shaft only to penetrate far enough into the retaining opening so that the distance between that surface of the head that faces the membrane and that surface of the retainer that faces the membrane is at least as large as the material thickness of the membrane.

An appropriate form of this stop is achieved by the fact that the retaining opening for the shaft of the pin is designed as a blind hole, against the bottom of which the pin strikes. Here, it is advantageous if the pin of the shaft is shaped so as to be complementary to the "bottom" of the blind hole.

In contrast to the prior art, the decisive advantage of this arrangement is that the material of the membrane retains its original flexibility. It is not stiffened by profiling or deformations, so that it poses almost the same—low—resistance that is possible when fastening the membrane disc by means of a pin with cylindrical shaft without a widening in the vicinity of the head according to the invention.

A substantial advantage of the invention is that known membranes without any change of the—usually complicated—form can continue to be manufactured and used. It is even possible to stamp the membrane out of sheet-like material.

In this case, the area of the membrane can take on an arbitrary shape. A circular shape, however, is particularly advantageous since, it has the smallest circumferential length in ratio to the area of the air opening and therefore to the respiratory air volume that can be maximally moved through it, and therefore the pretension that is achieved by enlarging the shaft of the pin in the vicinity of the head is distributed along the least possible length, that is to say the areal pressure in the contact area is maximized, and therefore the optimum sealing effect is obtained.

So that the distribution of this pretension force takes place as uniformly as possible approximately from the centre of the membrane as far as its edge, the invention prefers that both surfaces of the membrane are flat, since in this ease the pretension force in all directions of the membrane also effects the uniform development of the dome shape of the membrane This property is achieved, for example, in that the membrane—as mentioned—is stamped from a sheet-like material.

The desirable, uniform distribution of the contact pressure of the membrane edge on the frame is supported in one embodiment in that the fastening opening is cylindrically formed in the membrane and is oriented perpendicular to that surface of the membrane that is at the frame side. In this case, it is to be preferred that that portion of the shaft that is contiguous with the head is formed as a truncated cone, which merges into a cylindrically formed section of the shaft. This last cylindrical section corresponds in its diameter to the diameter of the fastening opening and does not press on the membrane in the radial direction.

Such a radially directed force that is uniformly distributed at all sides is only exerted by the truncated cone in the vicinity of the head. Since the truncated cone has its largest diameter directly at the head, the outwardly directed force is greatest there and decreases with increasing distance from the head of the shaft. If such a pin is pressed into the fastening opening of a membrane that does not yet lie on the frame, a slightly dome-shaped deformation of the membrane results. This effect ensures that only the outer edge of the membrane is pressed in a ring shape onto the frame if the membrane is fastened by means of the pin in the retaining opening of the retainer in the centre of the air opening.

If the membrane is stamped out of a sheet-like raw material, its retaining opening runs through the material. This opening must then be sealed again with the head and the shaft of the pin.

If the retaining opening is a through-passing bore, its seal must be secured. To this end, the invention proposes as an alternative embodiment that a collar is integrally formed on the membrane around the fastening opening, which collar projects into the retaining opening in the retainer. As a result, the collar develops as an additional sealing element between the shaft of the pin and the retaining opening. The sealing effect is improved if the collar is additionally forced against the retaining opening of the retainer by a slight overdimensioning of the shaft.

In a further embodiment, the collar is closed by a dome, a truncated cone or another closure. This ensures a perfect sealing effect of the membrane in its centre. In this case, the free end of the shaft should be formed so as to be complementary to the collar of the membrane and press-fitted or bonded therein. The collar, in its turn, is then press-fitted or bonded into the retaining opening of the retainer. By means of these two press-fit or adhesive bonds, the membrane is securely bonded to the retainer.

In the above-mentioned embodiment of the membrane as a disk that has been stamped from sheet-like material, the free end of the shaft can be press-fitted, bonded riveted, fused or screwed into the retaining opening of the retainer. Then, the connection of the shaft to the retaining opening performs the mechanical securing of the membrane. The perfect sealing of the fastening opening must be ensured by the development of the head and its contact at the outwardly facing surface of the membrane.

The membrane valve according to the invention is a decisive improvement for inhalation devices that contain a nebulizer for liquid active substances and contain guiding devices for the respiratory air of living organisms. If the guiding device for the respiratory air contains at least one membrane valve according to the invention, the undesirable penetration of moisture—for example from the respiratory air into the aerosol chamber—can be prevented thereby.

Other interesting applications are respirators, lung diagnosis equipment, breathing masks, oxygen apparatus or diving apparatus.

Further details and features of the invention are described below with reference to an example. This is not intended to restrict the invention, but only to explain it. In schematic, view:

FIG. 1 shows a section through a membrane valve in the rest state

FIG. 2 shows a section through a membrane valve as above before insertion into the frame FIG. 3 shows a cross-section through a membrane before installation FIG. 4 shows a cross-section through a membrane valve in an open state FIG. 5 schematically shows a membrane valve in an inhalation device.

FIG. 6 schematically shows a membrane valve used in an inhalation device, a respirator, a lung diagnosis device, a breathing mask, an oxygen apparatus, or a diving apparatus.

FIG. 1 shows the longitudinal section through membrane valve according to the invention. By means of a dash-dotted line in the centre, it is represented that the illustrated embodiment is rotationally symmetrical. The two sections through the frame (2) can be seen outermost. The frame (2) surrounds the air opening (21), which can be seen twice in FIG. 1, since it is interrupted in the centre by the retainer (23). The retainer (23)—in a similar way to a spoked wheel—is connected via the webs (22) to the frame (2), which encircles the air opening (21).

FIG. 1 shows the section through the membrane (1) as cross-hatching. The membrane (1) lies with its outer edge on the frame (2). The membrane (1) has outer portion (1A), which is more distant from the frame (2) and an inner portion (1B), which faces the frame (2). FIG. 2 shows how, in this region, the membrane can be lifted off the frame (2) by outflowing respiratory air, and thereby releases a path for the through-flowing gas.

In FIG. 1, in the centre of the membrane (1), the fastening opening (11) is identified by means of arrows. In the embodiment shown here, the membrane is introduced into a cylindrical fastening opening (11)—as shown in FIG. 3.

However, in FIG. 1, the fastening opening (11) is shown in the state in which a pin (3) is already pressed in. FIG. 1 shows clearly that the pin is cylindrical in the lower region (31A) of the shaft (31). In this lower region (31A), the diameter of the shaft (31) is just as large as the diameter of the fastening opening (11). It is only in the upper region (31B) of the shaft (31), in the direct vicinity of the head (32) (i.e., closest to the outer portion (1A)), that the diameter of the shaft (31) increases steadily. By this means the fastening opening (11) of the membrane (1) is also pressed apart on one portion.

Thus, in the region of the cross-section of the membrane (1) close to the outer surface, the pin (3) exerts an elevated pressure, which propagates across the outer region of the membrane (1) as far as the edge thereof, and ensures an elevated contact pressure of the edge of the membrane (1) on the frame (2). By this means it is ensured that, in this region, a gasket acting all round is built up, which also keeps back any moisture that penetrates.

FIG. 1 shows an embodiment of the retainer (23) with a stop. In this variant, the retainer opening (24) of the retainer (23) is embodied as a blind hole. The base of the blind hole serves as a stop for the pin. As a further alternative, the tip thereof is shaped so as to be complementary to the base of the blind hole.

In FIG. 2, for a better elucidation of the advantageous effect of the broadened portion of the shaft (31), a membrane (1) with a pin (3) already pressed in is drawn before insertion in the frame (2). It can be readily seen that the broadened portion of the shaft (31) exerts compressive forces on the upper portion of the cross-section of the membrane (1), which have the effect that the membrane (1) is bulged into a dome shape. By this means, the dome that is thus produced, during insertion in the frame (2), is only in contact on the frame (2) by its edge.

FIG. 3 shows, for the sake of completeness, for explaining the advantageous effect of the main feature of the invention—namely the conical enlargement of the shaft (31) of the pin (3)—the membrane (1) once again, but before installation. It can be clearly seen that the fastening opening (11) in the membrane (1) is entirely cylindrical in shape, as a result of which a sharp edge is produced, particularly at the entrance to the fastening opening (11). The conical enlargement of the shaft (31) of the pin (3) presses onto this sharp edge during pressing into the fastening opening (11) and into the collar. The volume of the permanently flexible membrane (1) that is displaced in the process generates the forces in the upper region of the cross-section, which ensures an increased contact pressure of the edge region of the membrane (1).

In FIG. 4, the example shown in FIG. 1 is repeated, but in the state in which air is flowing through, which is identified in each case by means of double arrows. It can be readily seen how the air passes through the air openings (21) of the frame (2), streaming past the webs (22) and pressing on the flexible membrane (1), which is thereby lifted, so that a slit opens between the outer surrounding frame (2) and the edge of the membrane (1), through which the air escapes.

In FIG. 4, it can be readily seen that, in this operating state, the flexible membrane (1) bulges in a dome shape, but upwards. It becomes clear that the forces exerted by the air pressure on the membrane (1), in this operating state, are greater than the forces that are exerted radially by the displacement of the material volume at the upper edge of the membrane (1).

LIST OF REFERENCE CHARACTERS

1 Membrane, planar, permanently flexible
11 Fastening opening in membrane 1
2 Frame, in contact with membrane 1
21 Air opening frame 2
22 Web, of frame 2 for retainer 23 in the centre of the air opening 21
23 Retainer, supported by at least one web 22
24 Retaining opening in retainer 23
3 Pin
31 Shaft of the pin 3
32 Head of the pin 3

The invention claimed is:
1. A membrane valve for inhalation devices, comprising:
a planar membrane made of permanently flexible material having a fastening opening disposed in a center of the membrane;
a frame having an air opening that is smaller than the membrane;
a retainer that is arranged at a center of the air opening, the retainer having a retaining opening;
at least one web that connects the frame with the retainer; and
a pin having a shaft that extends through the fastening opening in the center of the membrane, the shaft having a first portion located within the retaining opening in the retainer and a second portion located within the fastening opening, wherein
the membrane has an inner portion facing the frame and an outer portion opposite to the inner portion and more distant from the frame,
the pin widens into a head such that a spacing from the head to the membrane is smaller than a thickness of the membrane, or the head lies on the membrane,
a diameter of the second portion of the shaft located closest to the inner portion of the membrane is a first diameter, and a diameter of the second portion of the shaft located closest to the outer portion of the membrane is a second diameter larger than the first diameter, and
the second diameter is greater than a diameter of the fastening opening, and the first diameter is approximately equal to the diameter of the fastening opening such that the outer portion of the membrane is pressed apart by an enlarged diameter of the shaft near the outer portion of the membrane, and an inner portion of the membrane remains unloaded, such that the membrane is bulged adjacent to the fastening opening in the center of the membrane.

2. The membrane valve according to claim 1, wherein within the retaining opening, a stop for the shaft is disposed, which only allows the shaft to penetrate into the retaining opening to the extent that the distance between that surface of the head that faces the membrane and that surface of the retainer that faces the membrane is greater than or equal to the material thickness of the membrane.

3. The membrane valve according to claim 1, wherein the surface of the membrane is circular.

4. The membrane valve according to claim 1, wherein the fastening opening is cylindrical and oriented perpendicular to the frame-side surface of the membrane, and that portion of the shaft that is contiguous with the head is a truncated cone that merges into a cylindrical section of the shaft.

5. The membrane valve according to claim 1, wherein a collar is integrally formed on the membrane around the fastening opening, and the collar projects into the retaining opening in the retainer.

6. The membrane valve according to claim 5, wherein
a dome,
a truncated cone, or
another closure is integrally formed on the collar.

7. The membrane valve according to claim 5, wherein the second portion of the shaft is formed so as to be complementary to the collar of the membrane, and the second portion is press-fitted or adhesively bonded therein, and
wherein the collar is press-fitted or adhesively bonded into the retaining opening of the retainer.

8. The membrane valve according to claim 1, wherein the second portion of the shaft is
press-fitted,
adhesively bonded,
riveted,
fused,
screwed into the retaining opening, or
a combination thereof.

9. An inhalation device containing
a nebulization device for liquid active substances, and
a guide device for the respiratory air of living organisms comprising at least a membrane valve according to claim 1.

10. Application of a membrane valve according to claim 1 in
an inhalation device,
a respirator,
a lung diagnosis device,
a breathing mask,
an oxygen apparatus, or
a diving apparatus.

* * * * *